Feb. 7, 1928.  
P. G. HOLLSTEIN ET AL  
1,658,379  
CHOCOLATE MACHINE  
Filed June 14, 1922  
3 Sheets-Sheet 1
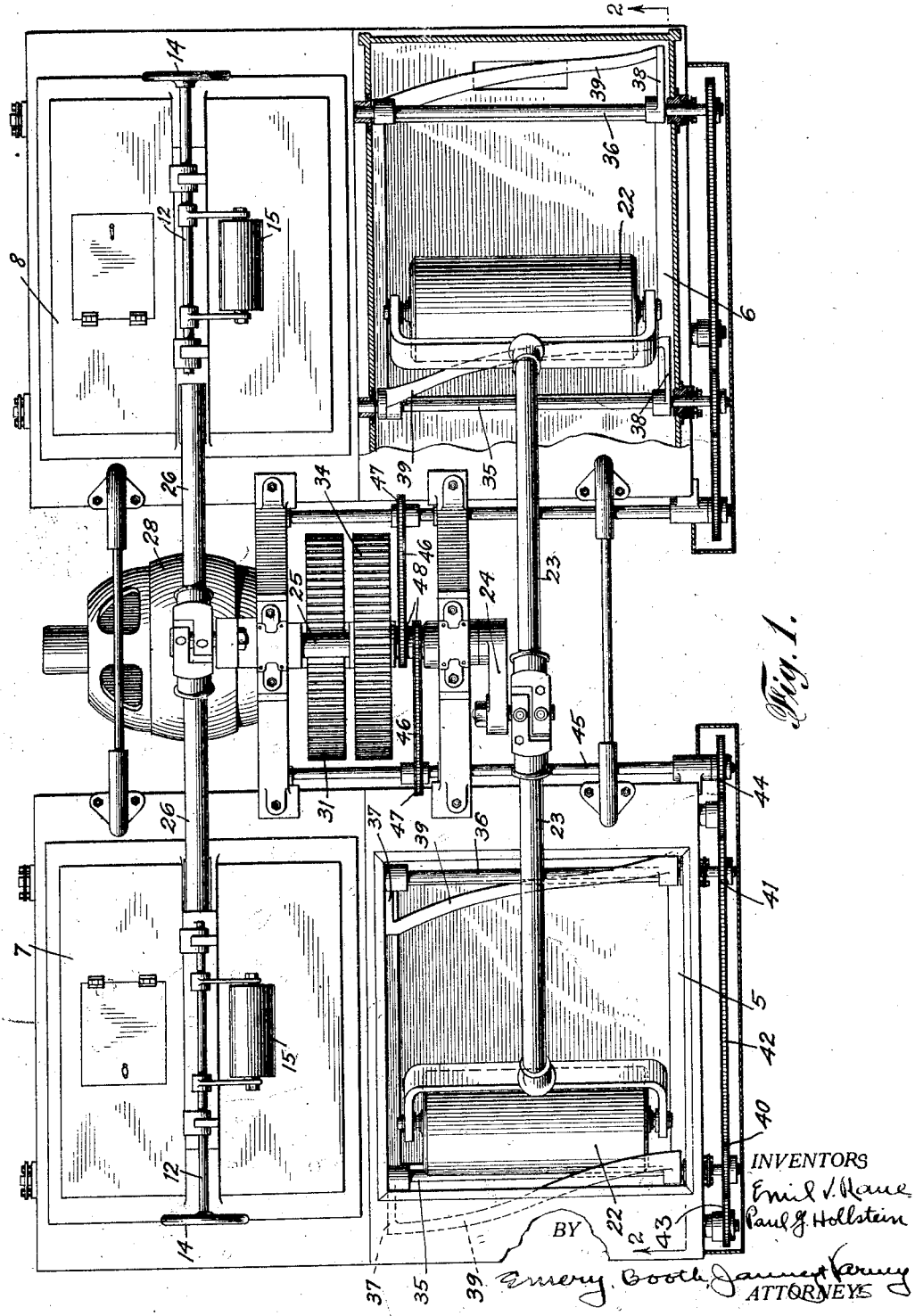

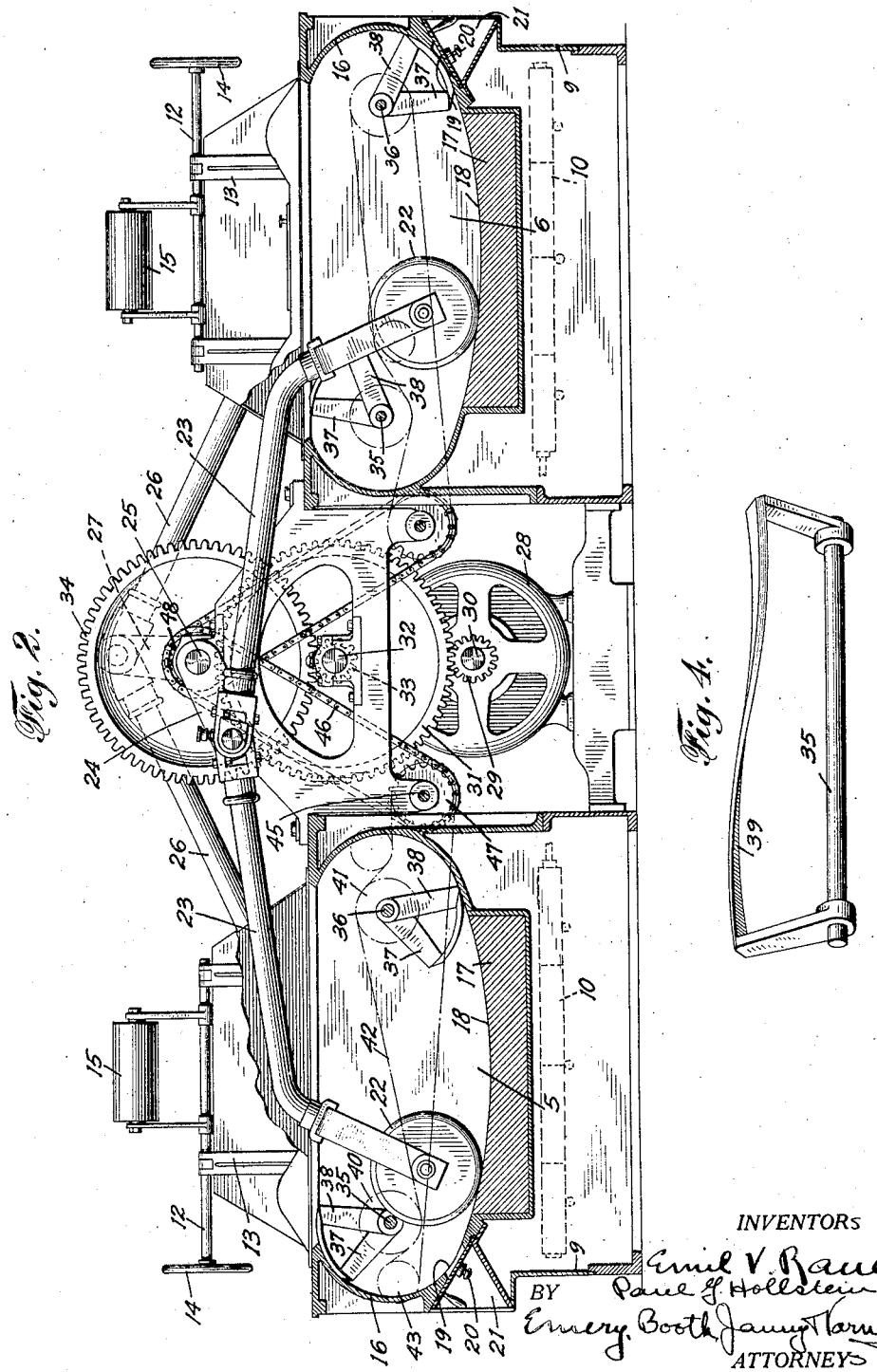

Feb. 7, 1928. 1,658,379
P. G. HOLLSTEIN ET AL
CHOCOLATE MACHINE
Filed June 14, 1922  3 Sheets-Sheet 3
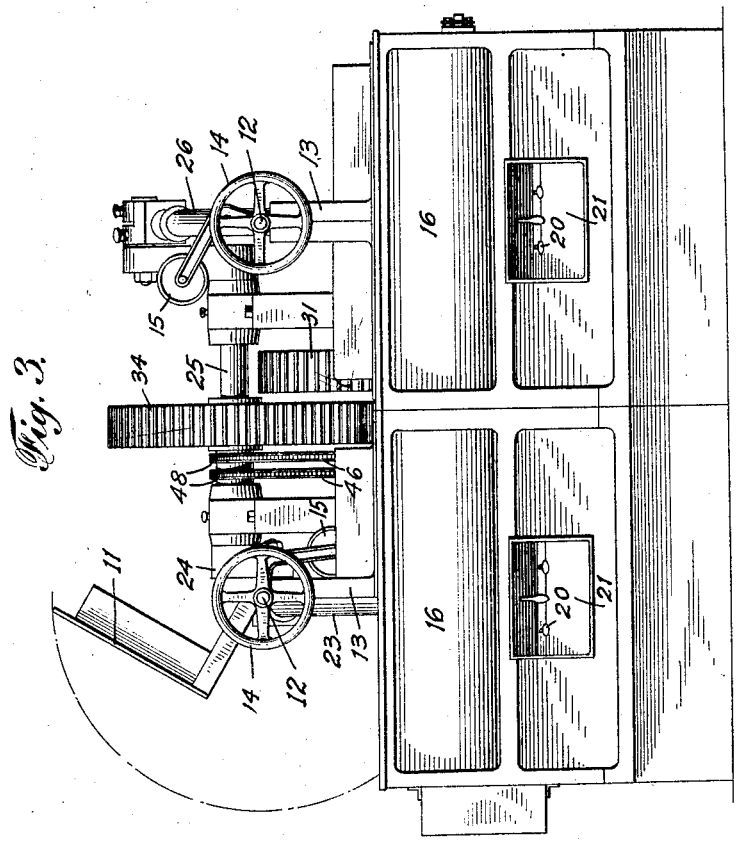
INVENTORS
Emil V. Raue
BY Paul G. Hollstein
Emery, Booth, Janney & Varney
ATTORNEYS Patented Feb. 7, 1928.

1,658,379

UNITED STATES PATENT OFFICE.

PAUL G. HOLLSTEIN, OF CARLSTADT, NEW JERSEY, AND EMIL V. RAUE, OF NEW YORK, N. Y., ASSIGNORS TO J. M. LEHMANN COMPANY, INC., OF NEW YORK, N. Y., A CORPORATION OF NEW YORK.

CHOCOLATE MACHINE.

Application filed June 14, 1922. Serial No. 568,329.

The present invention relates to improvements in chocolate working machines, and is particularly directed to what is known in the art as a conche machine. An object of the invention is to improve the construction of machines of this type generally, and in particular to provide additional mechanism for the working of the chocolate which will greatly increase the efficiency of the machine and enable the desired results to be obtained by working the chocolate in the machine for a much shorter period than is necessary in machines of this type as at present constructed.

In the manufacture of chocolate it is customary to take the ground cocoa as it comes from the grinding mill and add to it certain ingredients determined by the characteristics desired for the finished product. For example, in the manufacture of chocolate coatings, sugar is added to the cocoa, which, as it leaves the grinding machine, is in the form of a thick liquid, due to the heat generated in the grinding machine, and to the presence of cocoa butter. When a sufficient amount of sugar has been added the material is placed in a suitable mixer, and when mixed the material has the consistency of a stiff paste. Any other ingredients desired, such as flavoring extracts, may also be added at this time.

The fineness and quality of the finished chocolate depends to a greater extent upon the manner in which the mixture is worked, rather than upon the ingredients. The superior grades of chocolate require a considerable period of mechanical treatment before they are ready for use. It is customary, therefore, to provide different machines for working the chocolate and thereby improving its quality. The chocolate mixture is often first subjected to the action of a steel roll mill, which reduces the sugar crystals and makes a much more homogeneous mixture. But this is not entirely sufficient and after leaving the steel roll mill the material is subjected to a further treatment in machines of the type shown in the accompanying drawings. The quality of the finished product bears a direct relation to the period of treatment in the last-mentioned machines. Ordinary material is treated in these machines from one to six days, depending upon the quality of chocolate which it is desired to produce. When the material is first placed in these machines, it has the consistency of a stiff paste, and ordinarily one to two hours' running of the machine is required to bring this material to a proper consistency, when the effective work of the machine begins.

In certain general characteristics the machine of the present application resembles those now commonly used but the parts differ therefrom in certain important respects, which will later be specifically pointed out; these improvements making it possible to condition the material more quickly and to secure the same action upon the material in a much shorter time than formerly.

The general construction of the machine will first be described, and thereafter the particular improvement and its operation and advantages pointed out.

For purposes of illustration and description a preferred embodiment of the invention has been selected and is shown in the accompanying drawings, wherein Figure 1 is a top plan view of the machine with certain parts removed to show the interior construction;

Figure 2 is a longitudinal section on the line 2—2 of Figure 1;

Figure 3 is an end elevation; and

Figure 4 is a detail view which will be later referred to.

In the illustrated embodiment of the machine a series of pairs of bowls 5—6 and 7—8 is disclosed, but it is to be understood that the numbers of pairs may be varied at will and the bowls may also, if desired, be arranged singly. Each of these bowls is supported in a closed frame 9, within which is located means 10 for heating the bowls to facilitate the grinding of the chocolate, the means illustrated being in the form of a heating coil. Each of the bowls is closed at the top by a removable cover 11, which is secured to a supporting shaft 12 rotatably mounted in a frame 13. To the shaft 12 a hand wheel 14 is attached, by which the shaft may be actuated to raise and lower the cover. The cover is maintained in its raised position by a counter-weight 15, which is carried by the shaft 12 and extends from the side opposite to that from which the cover 11 extends. The bowls are formed with curved side walls 16 and curved bottoms 17, the bottom of each bowl being formed of a material such as to present a smooth, hard grinding surface 18. We have found that stones serve the purpose admirably. Each of the bowls is also provided with an outlet opening 19 through which the chocolate may be withdrawn, the opening being normally closed by a slide 20 and leading to a delivery chute 21.

In order that the chocolate may be ground on the surfaces 18 and otherwise worked, reciprocating grinding rolls 22 are provided, which rolls are adapted to travel over the grinding surfaces 18 of the bottoms of the bowls, stopping short of the walls 16 of the bowls and also throw the liquid chocolate back and forth with a whipping or beating action due to the shape of the ends of the bowls. The rolls 22 which are located within the bowls 5 and 6 are mounted on rods 23, which extend through slots in the covers of the said bowls, and are attached to a crank arm 24 rigid with an actuating shaft 25.

The rolls 22 in the bowls 7 and 8 are similarly carried by rods 26 which extend through slots in the covers of said bowls and are attached to a crank arm 27 rigid with the shaft 25 and arranged in such angular relation with the crank arm 24 that during the simultaneous operation of the rolls the load on the shaft 25 will be substantially constant due to the relative positions of the rolls within the bowls.

The shaft 25 is continuously driven by means of a motor 28, to the armature shaft of which the shaft 25 is connected by a train of gears, which includes a pinion 29 carried by the armature shaft 30 of the motor, a relatively large gear 31, which meshes with the pinion 29 and is rigid with a shaft 33, a pinion 33 which is also rigid with said shaft 32, and a relatively larger gear 34 which is rigid with the shaft 25 and meshes with the pinion 33.

It has been stated that the rolls 22 operate on the grinding surfaces of the bottoms 17, but in their reciprocation stop short of the curved walls 16 of the bowls. In order that the material which, particularly during the initial operation of the machine, collects between the positions where the rolls complete their reciprocatory movements and said end walls 16, may be continuously delivered from said spaces to the grinding surfaces 18, we have provided means for freeing the material from the walls 16 and throwing it back to the grinding surfaces of the bottoms 17. The said means also aids the whipping or beating action.

Referring particularly to the bowl 5, a pair of shafts 35 and 36 are mounted therein, one being adjacent to each of the curved walls 16 of the bowl and its longitudinal axis being the center of curvature of the walls 16. Each of the shafts 35 and 36 is provided with a pair of radially extending arms 37 and 38, which arms extend in angular relation to each other and are disposed at opposite ends of the shaft. These arms are connected together by a scraper and delivering blade 39 which is in the form of an ogee curve so as to facilitate the passage of the blade through the material collected between the roll and the wall and to facilitate also the scraping of the material from the adjacent wall. The shaft 35 is provided with a sprocket 40 and the shaft 36 with a sprocket 41. These shafts are continuously rotated to move the blades 39 upwardly in contact with the walls 16 and downwardly toward the center of the bowl by means of a chain 42 with which the sprockets 40 and 41 engage and which chain passes around the sprockets 43 and 44, the latter being mounted on a shaft 45 which in turn is actuated by a chain 46 passing around a second sprocket 47 on the shaft 45 and around a sprocket 48 on the shaft 25. Inasmuch as the construction of the chocolate scraping and delivering elements is the same in the other bowls and these elements are operated by chains from the main drive shaft 25, each is not specifically described.

In the operation of working the chocolate in the bowls the rolls 22 are reciprocated over the surfaces 18 of the bottoms 17 by means of the actuating mechanism which has been described. The reciprocation of these rolls and their rotation grinds and whips or beats the contents of the bowls to the desired degree depending, of course, upon the period of working and upon the condition of the material. While the operation of the machine may produce sufficient heat to make the material workable, there is a period during the preliminary stages of the treatment wherein sufficient heat is not produced. To reduce the working period to the minimum and to eliminate this preliminary period the temperature of the material within the bowls is raised to the desired point where it will be workable, by the heating elements 10. As the rolls reciprocate it is obvious some of the material will be forced ahead of the rolls and will be forced into the space between the positions where the rolls terminate their reciprocations and the curved walls 10. The continuous movement of the scraping and delivering elements from the lower to the upper portions of the walls 16 scrapes the material from the walls by means of the blades 39 and delivers it to the grinding surfaces. Thus all of the material within the bowls is continuously subjected to the grinding, whipping and beating action of the rolls 22 and, in addition, is worked by the action of the scraping and delivering elements so that the production of a homogeneous mass by the rolls 22 is greatly facilitated.

While we have described a particular embodiment of what we have termed scraping and delivering means, that embodiment was selected merely for the purpose of illustration, and the invention is not limited to that embodiment but resides broadly in the provision of means for delivering the material which accumulates adjacent to the walls 16 to the grinding surfaces, and in the combinations of said means with the various other means with which it cooperates.

We claim:

1. In a chocolate working machine, the combination with a bowl having a stationary grinding surface terminating short of the end walls of the bowl, of a reciprocatory roll operable on said surface, and revoluble means located between the end walls of the bowl and the grinding surface for freeing the walls of the bowl of and for returning the material which is forced from the surface by the movement of the roll to said surface.

2. In a chocolate working machine, the combination with a bowl having a grinding surface and curved walls extending beyond the same, of a grinding roll adapted to reciprocate across said surface, and means comprising a revoluble element located at each end of the bowl to free the walls of and return the material which is forced from the grinding surface by the roll to the grinding surface when the roll is at the adjacent end of said surface.

3. In a chocolate working machine, the combination with a pair of bowls having grinding surfaces and curved walls extending beyond the same, of rolls operable on said grinding surfaces, common means for reciprocating said rolls, revoluble means located adjacent the curved walls for freeing the material therefrom and returning it to the grinding surfaces, and means for revolving the last-mentioned means from the bottom to the top of said walls.

4. In a chocolate working machine, the combination with a bowl having curved walls, of a shaft arranged concentrically with each wall, radial arms projecting from each of said shafts at the ends thereof, and a curved blade extending between said arms and adapted to free the walls of the material being worked, and means for revolving said arms and blade about the axis of the shafts as a pivot.

5. In a chocolate working machine, the combination with a bowl having curved walls, of a shaft arranged concentrically with each wall, radial arms projecting from each of said shafts at the ends thereof, and a blade extending between said arms and adapted to free the walls of the material being worked, and means for revolving said arms and blade about the axis of the shafts as a pivot.

6. In a chocolate working machine, the combination with a bowl having curved walls, of a shaft arranged concentrically with each wall, radial arms projecting from each of said shafts radially in different directions, and an ogee curved blade extending between said arms and adapted to free the walls of the material being worked, and means for revolving said blade.

7. In a chocolate working machine, in combination, a rectangular bowl having curved end walls and straight side walls, said bowl having a stationary grinding surface terminating short of said end walls, a reciprocatory roll operable on said surface in close proximity to said side walls, and means to return to said grinding surface from the ends of said bowl material which is forced from the surface by movement of the roll.

8. In a chocolate working machine, in combination, a rectangular bowl having curved end walls and straight side walls, said bowl having a stationary grinding surface terminating short of said end walls, a roll operable on said surface adapted to reciprocate parallel to said side walls in close proximity thereto, and means to return to said grinding surface from the ends of said bowl material which is forced from the surface by movement of the roll.

9. In a chocolate working machine, in combination, a rectangular bowl having curved end walls and straight side walls, said bowl having a stationary grinding surface terminating short of said end walls, a reciprocating roll operable on said surface in close proximity to said side walls, and means located between said end walls and said grinding surface to return to said grinding surface material which is forced from the surface by movement of the roll.

10. In a chocolate working machine, in combination, a rectangular bowl having curved end walls and straight side walls, said bowl having a stationary grinding surface terminating short of said end walls, a reciprocatory roll operable on said surface in close proximity to said side walls, and rotary scraper means to return to said grinding surface from the ends of the bowl material which is forced from the surface by movement of the roll.

11. In a chocolate working machine, in combination, a rectangular bowl having curved end walls and straight side walls, said bowl having a stationary grinding surface terminating short of said end walls, a reciprocatory roll operable on said surface in close proximity to said side walls, and rotary scraper means mounted on an axis transverse the path of movement of said roll to return to said grinding surface material forced from the surface by movement of the roll.

In testimony whereof, we have signed our names to this specification this 10 day of June 1922.

PAUL G. HOLLSTEIN.
EMIL V. RAUE.